(12) United States Patent
Konetski

(10) Patent No.: US 7,043,588 B2
(45) Date of Patent: May 9, 2006

(54) INFORMATION HANDLING SYSTEM FEATURING MULTI-PROCESSOR CAPABILITY WITH PROCESSOR LOCATED IN DOCKING STATION

(75) Inventor: David Konetski, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 416 days.

(21) Appl. No.: 10/154,498

(22) Filed: May 24, 2002

(65) Prior Publication Data
US 2003/0221036 A1 Nov. 27, 2003

(51) Int. Cl.
G06F 13/00 (2006.01)

(52) U.S. Cl. ...................... 710/303; 710/304
(58) Field of Classification Search .............. 710/303, 710/304
See application file for complete search history.

(56) References Cited

U.S. PATENT DOCUMENTS

| | | | |
|---|---|---|---|
| 5,463,742 A | 10/1995 | Kobayashi | |
| 5,550,710 A | 8/1996 | Rahamim et al. | |
| 5,600,800 A * | 2/1997 | Kikinis et al. | 710/303 |
| 5,625,829 A * | 4/1997 | Gephardt et al. | 710/104 |
| 5,632,020 A * | 5/1997 | Gephardt et al. | 710/304 |
| 5,745,733 A * | 4/1998 | Robinson | 710/71 |
| 5,752,917 A | 5/1998 | Fuchs | |
| 5,935,226 A | 8/1999 | Klein | |
| 6,021,452 A * | 2/2000 | Birch et al. | 710/303 |
| 6,035,354 A | 3/2000 | Klein | |
| 6,170,020 B1 | 1/2001 | Blakeney et al. | |
| 6,219,233 B1 | 4/2001 | Moore et al. | |
| 6,239,970 B1 | 5/2001 | Nakai et al. | |
| 6,240,297 B1 | 5/2001 | Jadoul | |
| 6,259,601 B1 | 7/2001 | Jaggers et al. | |
| 6,438,622 B1 * | 8/2002 | Haghighi et al. | 710/1 |
| 6,549,968 B1 * | 4/2003 | Hart | 710/303 |
| 2002/0032042 A1 | 3/2002 | Poplawsky et al. | |

FOREIGN PATENT DOCUMENTS

JP 2002149589 A * 5/2002

OTHER PUBLICATIONS

Printed material from http://docs.info.apple.com and its subdirectories, dated May 1, 2002.
Printed material from http://www.cuhk.edu.hk and its subdirectories, dated May 1, 2002.

* cited by examiner

Primary Examiner—Glenn A. Auve
(74) Attorney, Agent, or Firm—Haynes and Boone, LLP

(57) ABSTRACT

An information handling system—docking station arrangement is disclosed. The information handling system includes a first processor coupled to a main memory and a first docking connector. The docking station includes a second docking connector which mates with the first docking connector of the information handling system. When the information handling system is docked with the docking station, the information handling system interrogates the docking station to determine if a second processor is present in the docking station. If the information handling system detects a second processor in the docking station, then the information handling system switches to a multi-processing mode in which both the first and second processors are employed to process information. However, if the information handling system does not detect a second processor, then the system uses the first processor to process information.

8 Claims, 6 Drawing Sheets

INFORMATION HANDLING SYSTEM FEATURING MULTI-PROCESSOR CAPABILITY WITH PROCESSOR LOCATED IN DOCKING STATION

BACKGROUND

The disclosures herein relate generally to information handling systems and more particularly to multi-processor information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as portable computers have experienced significant increases in performance over the years. One factor that influences the performance of portable computers is the clock speed of the processor. Since the late 1980's when processor clock speed was in the low Megahertz range, clock speed has now increased to the Gigahertz range. Unfortunately, as clock speed has increased, so has the amount of heat generated by the processor. Dissipation of heat is limited by the size of the information handling system. With portable computers, size is an especially significant constraint. Moreover, the trend is toward even smaller and lighter portable computers and this exacerbates the heat dissipation problem. As clock speed continues to rise, it will become increasingly difficult to remove heat generated by the processor in a portable computer with a specific volume.

Docking systems are known in which a portable computer or other information handling system is inserted into a docking station. The docking station can take the form of a port replicator which mates with the computer and passes I/O signals to common connectors to provide easy connection to a keyboard, pointing device, video monitor and other I/O devices. Beyond the simple signal "pass-through" provided by port replicators, more advanced docking stations are known that accept peripherals such as video cards, modems and multi-media cards therein. However, docking stations can actually place more of a cooling burden on a portable computer because airflow around the portable computer is often decreased when the computer is docked. Moreover, such conventional docking solutions do not increase the computational power of the processor in the portable computer.

Therefore, What is needed is a way to increase the processing power available in a portable computer system without causing significant additional burdensome cooling requirements.

SUMMARY

Accordingly, in one embodiment an information handling system is provided which includes a first processor and a memory coupled to the first processor. The system further includes a docking connector, coupled to the first processor, for docking the system to a docking station. The system also includes a multi-processor handler, coupled to the first processor, the memory and the docking connector, for switching the information handling system to a multi-processor mode when the docking connector is docked to the docking station and if the docking station includes a second processor. However, the information handling system operates in a single processor mode when the system is not docked to a docking station or when the system is docked with a docking station that does not include a second processor.

In another embodiment, an information handling system docking station combination is provided wherein the information handling system includes a first processor, a first memory coupled to the first processor and a first docking connector coupled to the first processor. The docking station includes a second processor and a second docking connector which is coupled to the second processor. The second docking connector of the docking station docks and mates with the first docking connector of the information handling system. The information handling system further includes a multi-processor handler, coupled to the first processor, the first memory and the docking connector, for switching the information handling system to a multi-processor mode when the system is docked to the docking station and for switching the system to a single processor mode when the system is not docked to the docking station.

A principal advantage of the embodiments disclosed herein is the substantial increase in performance in terms of computational power provided to the user of an information handling system docked with a docking station including another processor. This increase is achieved without adding significant heat generation or weight to the information handling system.

DETAILED DESCRIPTION

Figure 1:
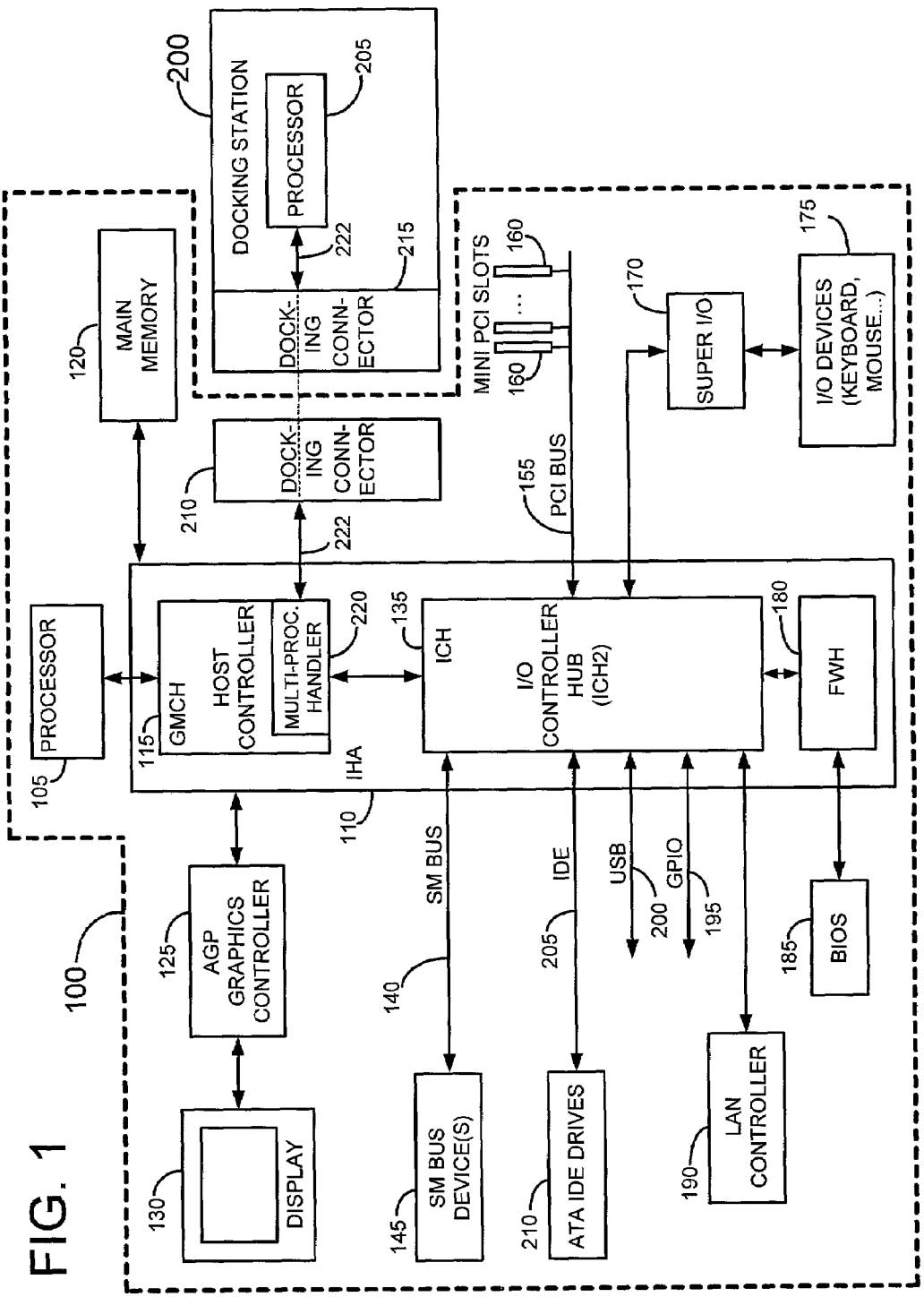
FIG. 1 is a block diagram of one embodiment of the information handling system employing the disclosed docking station including a second processor.

FIG. 1 depicts a high level block diagram of an information handling system 100 in which the disclosed technology is practiced. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The particular information handling system 100 depicted in FIG. 1 is a portable computer which is docked with a docking station 200. Portable computer 100 includes a processor 105 and docking station 200 includes a processor 205. Processor 205 augments the processing power of processor 105. Processors 105 and 205 can process common or different threads of a program or programs at the same time. Processors 105 and 205 operate together in multi-processor fashion. While only one processor 205 is shown in the docking station 200 embodiment depicted in FIG. 1, docking station 200 can be provided with additional processors to further augment the processing power available to the user of portable computer 100 when docked.

An Intel Hub Architecture (IHA) chip 110 provides system 100 with memory and I/O functions. More particularly, IHA chip 110 includes a Graphics and AGP Memory Controller Hub (GMCH) 115. GMCH 115 acts as a host controller that communicates with processor 100 and further acts as a controller for main memory 120. GMCH 115 also provides an interface to Advanced Graphics Port (AGP) controller 125 which is coupled thereto. A display 130 is coupled to AGP controller 125. IHA chip 110 further includes an I/O Controller Hub (ICH) 135 which performs numerous I/O functions. ICH 135 is coupled to a System Management Bus (SM Bus) 140 which is coupled to one or more SM Bus devices 145.

ICH 135 is coupled to a Peripheral Component Interconnect (PCI) bus 155 which is coupled to mini PCI connector slots 160 which provide expansion capability to portable computer 100. A super I/O controller 170 is coupled to ICH 135 to provide connectivity to input devices such as a keyboard and mouse 175 as shown in FIG. 1. A firmware hub (FWH) 180 is coupled to ICH 135 to provide an interface to system BIOS 185 which is coupled to FWH 180. A General Purpose I/O (GPIO) bus 195 is coupled to ICH 135. USB ports 200 are coupled to ICH 135 as shown. USB devices such as printers, scanners, joysticks, etc. can be added to the system configuration on this bus. An integrated drive electronics (IDE) bus 205 is coupled to ICH 135 to connect IDE drives 210 to the computer system.

Portable computer 100 includes a docking connector 210 which mates with a docking connector 215 in docking station 200. As shown in FIG. 1, processor 205 in the docking station is coupled via docking connectors 210 and 215 to a multi-processor handler 220 within host controller 115. This connection is achieved by a high speed, high bandwidth bus 222 such as provided by a 3GIO (Third Generation I/O) bus or other fast bus. Bus 222 must be sufficiently fast to handle processor 205 to memory 120 communications. Multi-processor handler 220 provides the glue logic which permits processor 105 and processor 205 to work together in a multiprocessor mode when portable computer 100 is docked in docking station 200. When portable computer 100 is docked, multi-processor handler 220 also enables processor 205 to share main memory 120 with processor 105. However, when portable computer 100 is not docked with docking station 200, this undocked condition is sensed and multi-processor handler 220 switches operation of processor 105 and main memory 120 to a single processor mode.

Figure 2:
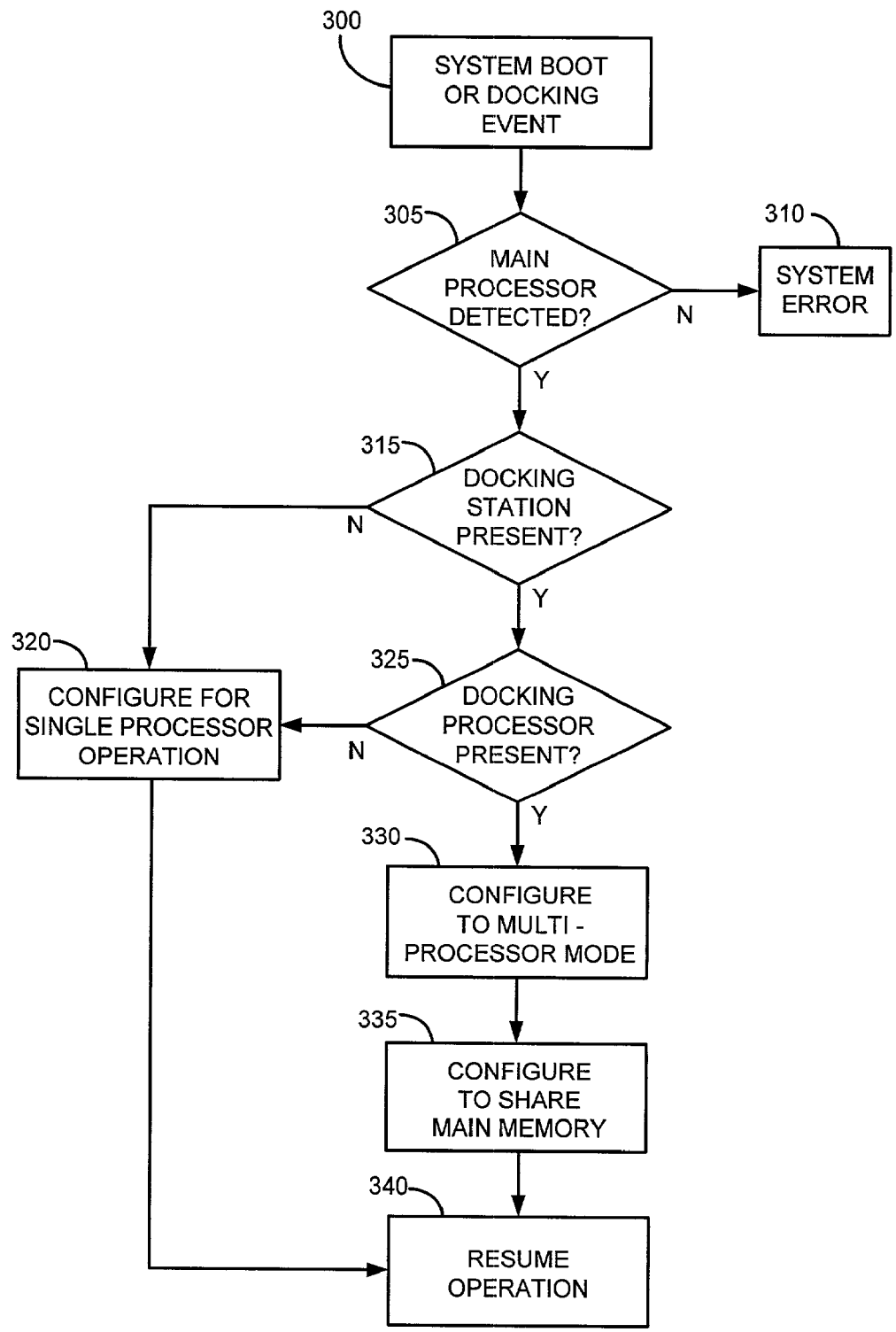
FIG. 2 is flowchart describing the operation of the information handling system of FIG. 1.

FIG. 2 is a flowchart which details the operation of multi-processor handler 220 in the embodiment of FIG. 1 wherein processor 105 and processor 205 share the same main memory 120 located in portable computer 100. More particularly, when multi-processor handler 220 observes a system boot or docking event as per step 300, a test is conducted at decision block 305 to confirm that the main processor 105 is present. If main processor 105 is not detected, then a system error is reported as per block 310. If main processor 105 is detected, then a test is conducted to determine if docking station 200 is present and docked with portable computer 100 as per decision block 315. If the docking station 200 is not present, then multi-processor handler 220 configures portable computer 100 for single processor operation with no memory sharing as per block 320. However, if docking station 200 is present and docked with portable computer 100, a test is conducted at decision block 325 to determine if a processor is present in docking station 200. If no processor is detected in docking station 200, then multi-processor handler 220 configures portable computer 100 for single processor operation with no memory sharing, again as per block 320. However, if a processor is detected in docking station 200, then multi-processor handler 220 configures portable computer 100 to a multi-processor mode wherein processor 205 augments the processing power of processor 105 as per block 330 and both processors share the same main memory 120 as per block 335. Normal system operation then resumes at block 340 at which the system is available to perform other system or user tasks.

Figure 3:
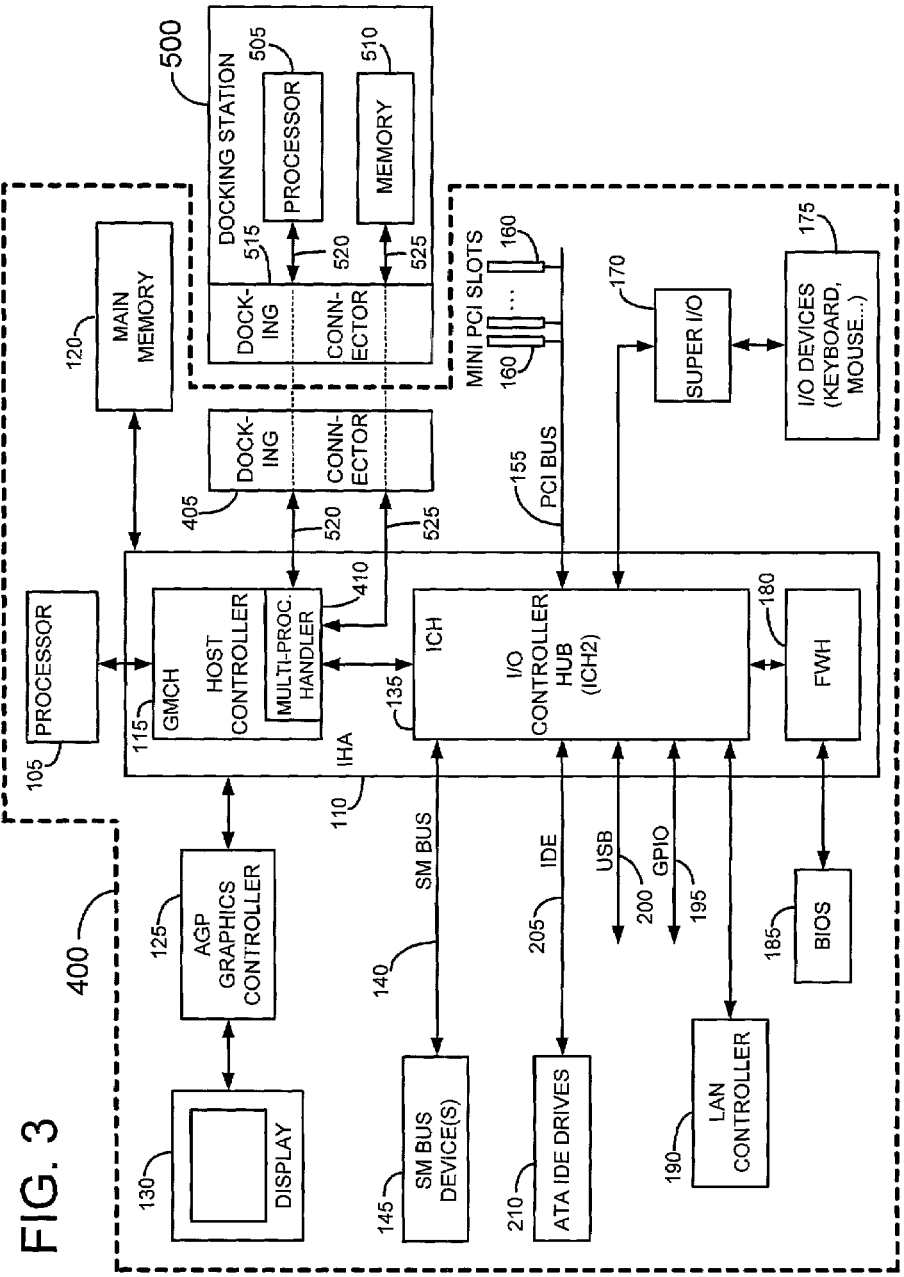
FIG. 3 is a block diagram of another embodiment of the information handling system employing the disclosed docking station including a second processor.

FIG. 3 shows another embodiment of the disclosed information handling system as information handling system 400. In this particular embodiment, a portable computer is employed as information handling system 400 for illustrative purposes. Portable computer 400 of FIG. 3 is similar to portable computer 100 of FIG. 1 with like numbers indicating like elements. However, in this embodiment a docking station 500 is provided which includes its own local memory 510. For this reason, processor 505 in docking station 500 need not share main memory 120 with main processor 105. Portable computer 400 includes a docking connector 405 which mates with a docking connector 515 in docking station 500. Portable computer 400 includes a host controller 115 having a multi-processor handler 410 which provides the glue logic that permits processor 105 and processor 505 to work together in a multi-processor mode when portable computer 400 is docked in docking station 500. High speed, high bandwidth buses 520 and 525 respectively connect processor 505 and its local dock memory 510 to multi-processor handler 410. One high speed bus which is acceptable for use as buses 520 and 525 is the 3GIO bus. Multi-processor handler 410 communicates with dock processor 505 via bus 520 and coordinates multi-processing activities between main processor 105 and dock processor 505. Multi-processor handler 410 also controls data flow between dock processor 505 and its local dock memory 510 and the remainder of the system.

Figure 4:
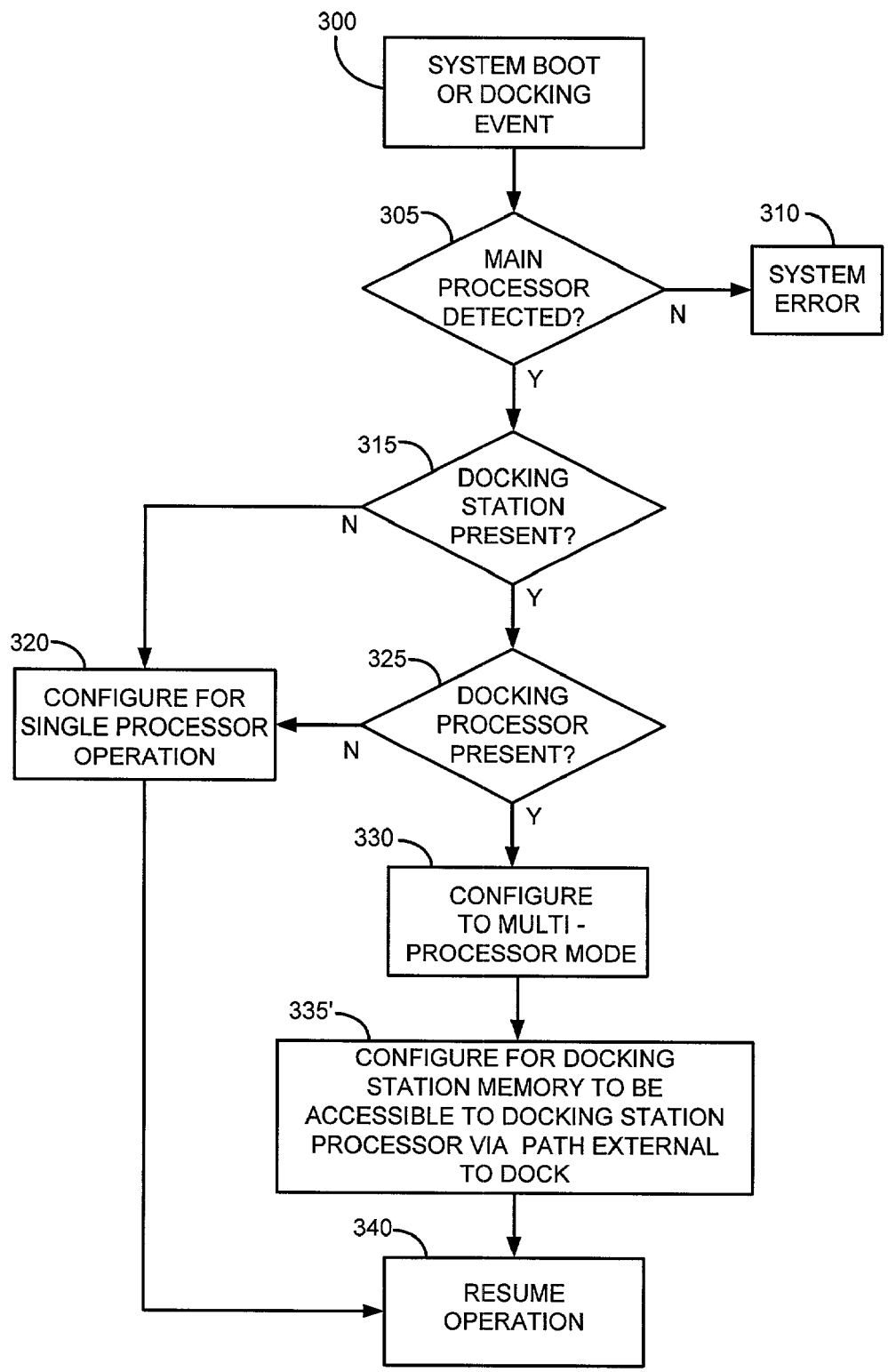
FIG. 4 is flowchart describing the operation of the information handling system of FIG. 3.

FIG. 4 is a flowchart which describes the operation of multi-processor handler 220 in the embodiment of FIG. 3 wherein dock processor 505 has a local dock memory situated in docking station 500. The steps of the flowchart of FIG. 4 are similar to the steps of the flowchart of FIG. 2 with like steps being indicated by like numbers. However, after multi-processor handler 410 configures portable computer 100 for multi-processor operation between main processor 105 and dock processor 505, a step 335' is carried out wherein multi-processor handler 410 configures portable computer 100 to allow communication between dock processor 505 and local dock memory 510 and the remainder of the system.

Figure 5:
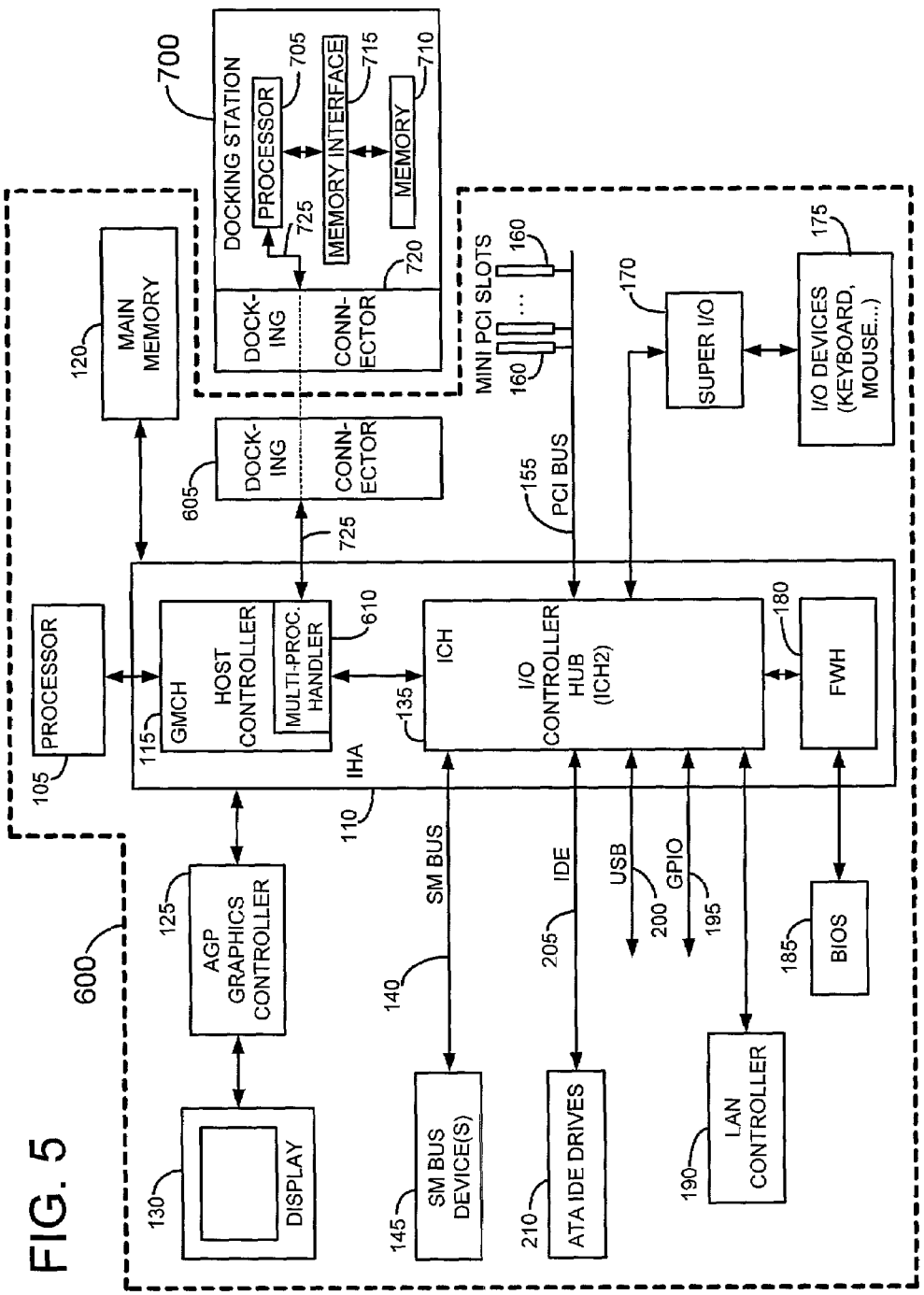
FIG. 5 is a block diagram of yet another embodiment of the information handling system employing the disclosed docking station including a second processor.

FIG. 5 shows yet another embodiment of the disclosed information handling system as information handling system 600. In this particular embodiment, a portable computer is employed as information handling system 600 for illustrative purposes. Portable computer 600 of FIG. 5 is similar to portable computer 100 of FIG. 1 with like numbers indicating like elements. However, in this embodiment a docking station 700 is provided which includes a processor 705 having its own local dock memory 710. Processor 705 is connected via local memory interface 715 to local dock memory 710 such that processor 705 need not rely on a path back through portable computer 600 to communicate with its local dock memory 710. Portable computer 600 includes a docking connector 605 which mates with a docking connector 720 in docking station 700. Portable computer 600 includes a host controller 115 having a multi-processor handler 610 which provides the glue logic that permits main processor 105 and dock processor 705 to work together in a multi-processor mode when portable computer 600 is docked in docking station 700. A high speed, high bandwidth bus 725 connects dock processor 705 to multiprocessor handler 610. One high speed bus which is acceptable for use as bus 725 is the 3GIO bus. Multi-processor handler 610 communicates with dock processor 705 via bus 725 and coordinates multi-processing activities between main processor 105 and dock processor 705. Multi-processor handler 610 also controls data flow between dock processor 705 and its local dock memory 710 and the remainder of the system.

Figure 6:
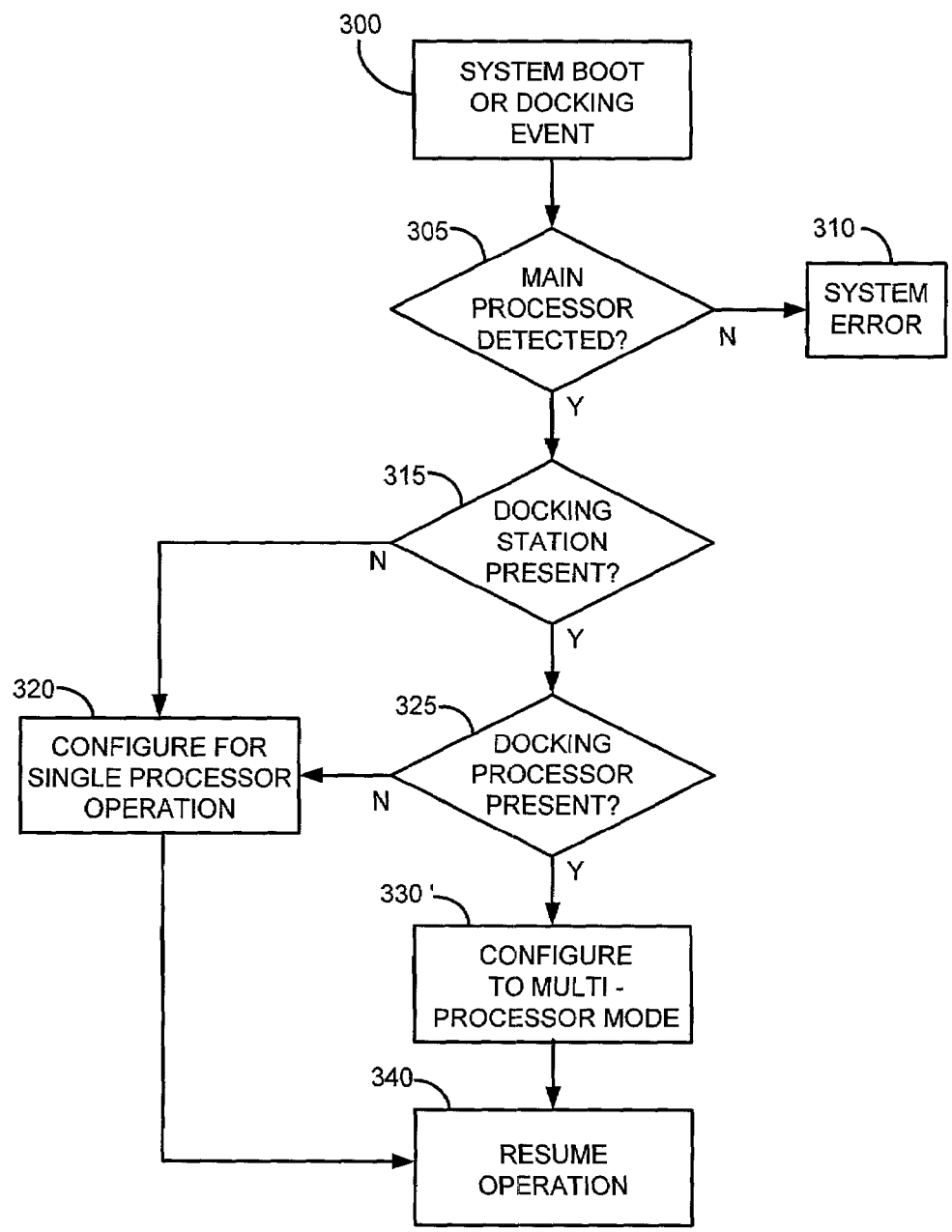
FIG. 6 is flowchart describing the operation of the information handling system of FIG. 5.

FIG. 6 is a flowchart which describes the operation of multi-processor handler 610 in the embodiment of FIG. 5 wherein dock processor 705 has a local dock memory 710 situated in docking station 700. The steps of the flowchart of FIG. 6 are similar to the steps of the flowchart of FIG. 2 with like steps being indicated by like numbers. However, after dock processor 705 is detected at step 325, multi-processor handler 610 configures portable computer 100 for multi-processor operation between main processor 105 and dock processor 705 as per block 330'. The processing power of main memory 105 is thus augmented by dock processor 705. In this embodiment, because processor 705 has its own local dock memory 710, it need not rely on sharing of memory 120 with main processor 105. However, an embodiment is envisioned wherein dock processor 705 can access both its local dock memory 710 and main memory 120.

It is noted that in addition to the disclosed processor augmentation technology described above, embodiments of the information handling system and docking station can also include traditional I/O replication and expansion features found in many information handling system docking systems. It is noted that the disclosed embodiments differ from workstation clustering and peer to peer load sharing because the multiple processors herein are connected via a common core logic chip set and computing architecture as shown rather than by local area network (LAN) technology.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An information handling system comprising:
    a first processor;
    a first memory coupled to the first processor;
    a docking connector, coupled to the first processor, for docking the system to a docking station including a second processor;
    a chip including a host controller having a multi-processor handler, coupled to permit the first and second processors to work together in a multi-processor mode in response to the system being docked in the docking station, and to enable the first and second processors to share the first memory via the chip;
    in response to the system not being docked in the docking station, the multi-processor handler switching operation of the first processor and the first memory to a single processor mode; and
    the docking station including a second memory, the multi-processor handler controlling data communication between the second processor and the second memory in the docking station when the docking connector is docked to the docking station.

2. The information handling system of claim 1 wherein the docking station includes a memory interface to couple the second memory to the second processor.

3. An information handling system docking station combination comprising:
    an information handling system including:
        a first processor;
        a first memory coupled to the first processor;
        a first docking connector coupled to the first processor;
        a docking station including:
            a second processor, the first and second processors being connected by a common core logic chipset and computing architecture; and
            a second docking connector, coupled to the second processor, for docking to the first docking connector;
        the information handling system further including a chip including a host controller having a multi-processor handler, coupled to permit the first and second processors to work together in a multi-processor mode in response to the system being docked in the docking station, and to enable the first and second processors to share the first memory via the chip;
        in response to the system not being docked in the docking station, the multi-processor handler switching operation of the first processor and the first memory to a single processor mode; and the docking station including a second memory coupled to the second docking connector, the multi-processor handler controlling data communication between the second processor and the second memory in the docking station when the information handling system is docked to the docking station.

4. The information handling system of claim 3 wherein the docking station includes a memory interface to couple the second memory to the second processor.

5. A system comprising:
   a docking station for docking with an information handling system including a first processor and a first memory;
   a second processor in the docking station;
   a docking connector coupled to the second processor to enable multi-processor operation when the information handling system is docked to the docking connector, the first and second processors being connected by a common core logic chipset and computing architecture;
   a chip including a host controller having a multi-processor handler coupled to permit the first and second processors to work together in a multi-processor mode in response to the system being docked in the docking station, and to enable the first and second processors to share the first memory via the chip;
   in response to the system not being docked in the docking station, the multi-processor handler switching operation of the first processor and the first memory to a single processor mode; and
   the docking station including a second memory, the multi-processor handler controlling data communication between the second processor and the second memory in the docking station when the docking connector is docked to the docking station.

6. The system of claim 5 further including a memory interface coupling the second memory to the second processor.

7. A method of operating an information handling system comprising:
   providing an information handling system including a first processor coupled to a first memory and to a docking connector;
   providing a docking station including a second processor;
   providing a chip including a host controller having a multi-processor handler to permit the first and second processors to work together in a multi-processor mode in response to the system being docked in the docking station, and to enable the first and second processors to share the first memory via the chip;
   in response to the system not being docked in the docking station, the multi-processor handler switching operation of the first processor and the first memory to a single processor mode; and
   providing the docking station with a second memory, the multi-processor handler controlling data communication between the second processor and the second memory in the docking station when the docking connector is docked to the docking station.

8. A method of operating an information handling system comprising:
   providing an information handling system including a first processor coupled to a first memory and to a first docking connector;
   providing a docking station including a second docking connector which mates with the first docking connector;
   connecting the first docking connector to the second docking connector;
   detecting, by the information handling system, the presence of a second processor in the docking station if a second processor is present therein, the first and second processors being connected by a common core logic chipset and computing architecture;
   providing a chip including a host controller having a multi-processor handler to permit the first and second processors to work together in a multi-processor mode in response to the system being docked in the docking station, and to enable the first and second processors to share the first memory via the chip;
   in response to the system not being docked in the docking station, the multi-processor handler switching operation of the first processor and the first memory to a single processor mode; and
   the docking station including a second memory, the multi-processor handler controlling data communication between the second processor and the second memory in the docking station when the docking connector is docked to the docking station.

* * * * *